United States Patent
Wong et al.

(10) Patent No.: US 11,321,838 B2
(45) Date of Patent: May 3, 2022

(54) DISTRIBUTED SENSOR MODULE FOR EYE-TRACKING

(71) Applicant: Facebook Technologies, LLC, Menlo Park, CA (US)

(72) Inventors: Jeffrey Hung Wong, San Francisco, CA (US); Martin Henrik Tall, Redwood City, CA (US); Jixu Chen, Redwood City, CA (US); Kapil Krishnakumar, San Mateo, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 68 days.

(21) Appl. No.: 17/007,939

(22) Filed: Aug. 31, 2020

(65) Prior Publication Data

US 2022/0067924 A1    Mar. 3, 2022

(51) Int. Cl.
*G06K 9/46*    (2006.01)
*G06T 7/00*    (2017.01)
(Continued)

(52) U.S. Cl.
CPC ........ *G06T 7/0012* (2013.01); *G02B 27/0093* (2013.01); *G02B 27/0172* (2013.01);
(Continued)

(58) Field of Classification Search
CPC ........... G06K 9/00261; G06K 9/00288; G06K 9/00228; G06K 9/00268; G06K 9/00281; G06K 9/6202; G06K 2009/4666; G06K 9/00362; G06K 9/4642; G06K 9/6206; G06K 9/6255; G06K 9/6256; G06K 9/00275; G06K 9/00308; G06K 9/00926; G06K 9/3233; G06K 9/4671; G06K 9/6215; G06K 9/6228; G06K 9/6262; G06K 9/627; G06K 9/6276; G06K 9/629; G06N 3/0454; G06N 3/084; G06N 3/08; G06T 11/00; G06T 2207/10016; G06T 2207/10024; G06T 2207/20081; G06T 2207/30201; G06T 2207/30241; G06T 2207/30244; G06T 7/251; G06T 7/74; G06T 7/80

See application file for complete search history.

(56) References Cited

U.S. PATENT DOCUMENTS

2016/0223819 A1*  8/2016  Liu ......................... G06F 3/013
2019/0065845 A1*  2/2019  Xu ..................... G06K 9/00604
2019/0387168 A1* 12/2019  Smith ................... G06F 1/1686

* cited by examiner

*Primary Examiner* — Quan M Hua
(74) *Attorney, Agent, or Firm* — Baker Botts L.L.P.

(57) ABSTRACT

In one embodiment, a method for eye-tracking comprises capturing images of a user using one or more cameras, the captured images of the user depicting at least an eye of the user, storing the captured images of the user in a storage device, reading, from the storage device, a down-sampled version of the captured images of the user, detecting one or more first segments in the down-sampled version of the captured images by processing the down-sampled version of the captured images using a machine-learning model, the one or more first segments comprising features of the eye of the user, reading, from the storage device, one or more second segments in the captured images corresponding to the one or more first segments in the down-sampled version of the captured images, and computing a gaze of the user based on the one or more second segments in the captured images.

20 Claims, 8 Drawing Sheets

(51) Int. Cl.
    *G06T 7/20*          (2017.01)
    *G06F 3/01*          (2006.01)
    *G02B 27/01*         (2006.01)
    *G06N 20/00*         (2019.01)
    *G02B 27/00*         (2006.01)

(52) U.S. Cl.
    CPC .............. *G06F 3/013* (2013.01); *G06F 3/017* (2013.01); *G06N 20/00* (2019.01); *G06T 7/20* (2013.01); *G02B 2027/0138* (2013.01); *G06T 2207/20081* (2013.01); *G06T 2207/30041* (2013.01)

DISTRIBUTED SENSOR MODULE FOR EYE-TRACKING

TECHNICAL FIELD

This disclosure generally relates to eye-tracking, and more specifically methods, apparatus, and system for eye-tracking by detecting features from down-sampled images.

BACKGROUND

Mobile devices like AR/VR headsets face several practical design constraints. One of the challenges is the need to minimize power consumption, so that these wearable devices can become lighter and smaller and yet have a better battery life. One approach to reduce power consumption is to utilize machine learning to perform object tracking. However, an object tracking which heavily relies on machine learning requires a large network which occurs inevitable power consumption and does not provide accurate results sufficiently.

SUMMARY OF PARTICULAR EMBODIMENTS

To address the foregoing problems, disclosed are methods, apparatuses, and a system, to perform object tracking at a sensor module by detecting features from down-sampled images. The present disclosure provides a self-sufficient sensor module in a tracking system. The sensor module comprises a camera, a storage device, a detecting unit, and a computing unit to efficiently detect specific features from down-sampled images via a machine-learning model, such that the sensor module can generate/compute an image specific to these features without excessively reading segments in the images and lower power consumption. The camera is configured to capture one or more images of a user depicting at least an eye of the user, and the storage device is configured to store these images. The detecting unit may detect, from a down-sampled version of the images, one or more first segments comprising features of the eye of the user, and read, from the storage device, one or more second segments in the one or more images corresponding to the first segments in the down-sampled version of the images. The computing unit may then compute a gaze of the user based on the second segments comprising the features of the eye in the images, without searching features in each segment in the original images which requires extra time and power to read/detect every segment from the original images.

The embodiments disclosed herein are only examples, and the scope of this disclosure is not limited to them. Particular embodiments may include all, some, or none of the components, elements, features, functions, operations, or steps of the embodiments disclosed herein. According to one embodiment of a method, the method comprises, by a computing system, capturing one or more images of a user using one or more cameras, the one or more images of the user depicting at least an eye of the user. The method further comprises storing the one or more images of the user in a storage device. The method yet further comprises reading, from the storage device, a down-sampled version of the one or more images of the user. The method additionally comprises detecting one or more first segments in the down-sampled version of the one or more images by processing the down-sampled version of the one or more images using a machine-learning model, the one or more first segments comprising features of the eye of the user. The method additionally comprises reading, from the storage device, one or more second segments in the one or more images corresponding to the one or more first segments in the down-sampled version of the one or more images. The method further comprises computing a gaze of the user based on the one or more second segments in the one or more images.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Certain aspects of the present disclosure and their embodiments may provide solutions to these or other challenges. There are, proposed herein, various embodiments which address one or more of the issues disclosed herein. The methods disclosed in the present disclosure may provide a self-efficient sensor module to track features of the user's eye from a down-sampled image and compute a gaze of the user by retrieving corresponding segments from high-resolution images, such that the sensor module may compute an accurate gaze of the user and operate with little power consumption by reducing memory access. Furthermore, the sensor module may send identified segments in the original images and the computed gaze of the user to a central module for extensive services to save power, such as image refinement, machine-learning training, and localization.

Particular embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Currently, AR/VR devices face multiple challenges, such as a light-weighted head-mounted device and power consumption. However, reading each segment in the captured images to detect a tracking feature consumes a lot of power which impacts the battery performance and requires a large network. Particular embodiments disclosed in the present disclosure provide a self-efficient sensor module, which is allowed to detect tracking features from a down-sampled version of the captured images to save power, e.g., by reducing the amount of the segments need to be read, and computes an image of the tracking features by retrieving segments in the captured images corresponding to the segments comprising the detected features in the down-sampled captured images. In addition, the sensor module may communicate with a central module for specific services. For example, the central module may process an image refinement, a feature metadata retrieval, a global localization, and the like to reduce power consumption of the sensor module.

Embodiments described herein relate to machine-learning models and various optimization techniques that enable computing devices with limited system resources (e.g., mobile devices such as smartphones, tablets, and laptops) to recognize features of objects captured in images or videos. To enable computing devices with limited hardware resources (e.g., in terms of processing power and memory size) to perform such tasks and to do so within acceptable time constraints, embodiments described herein provide a compact machine-learning model with an architecture that is optimized for performing various image-process tasks efficiently.

Particular embodiments disclosed in the present disclosure provide a sensor module in a tracking system comprising a camera, a storage device, a detecting unit, and a computing unit to perform a power-efficient feature tracking by detecting features in segments in a down-sampled image using a machine-learning model. For example, particular embodiments are directed to real-time detection and segmentation in the down-sampled image. Furthermore, the sensor module may render an image specific to the tracking features accurately and vividly based on segments in captured images corresponding to the detected segments in the down-sampled image. Therefore, the tracking system disclosed in the present disclosure is able to provide a power-saving, self-efficient tracking and detailed computed images for the user.

Figure 1:
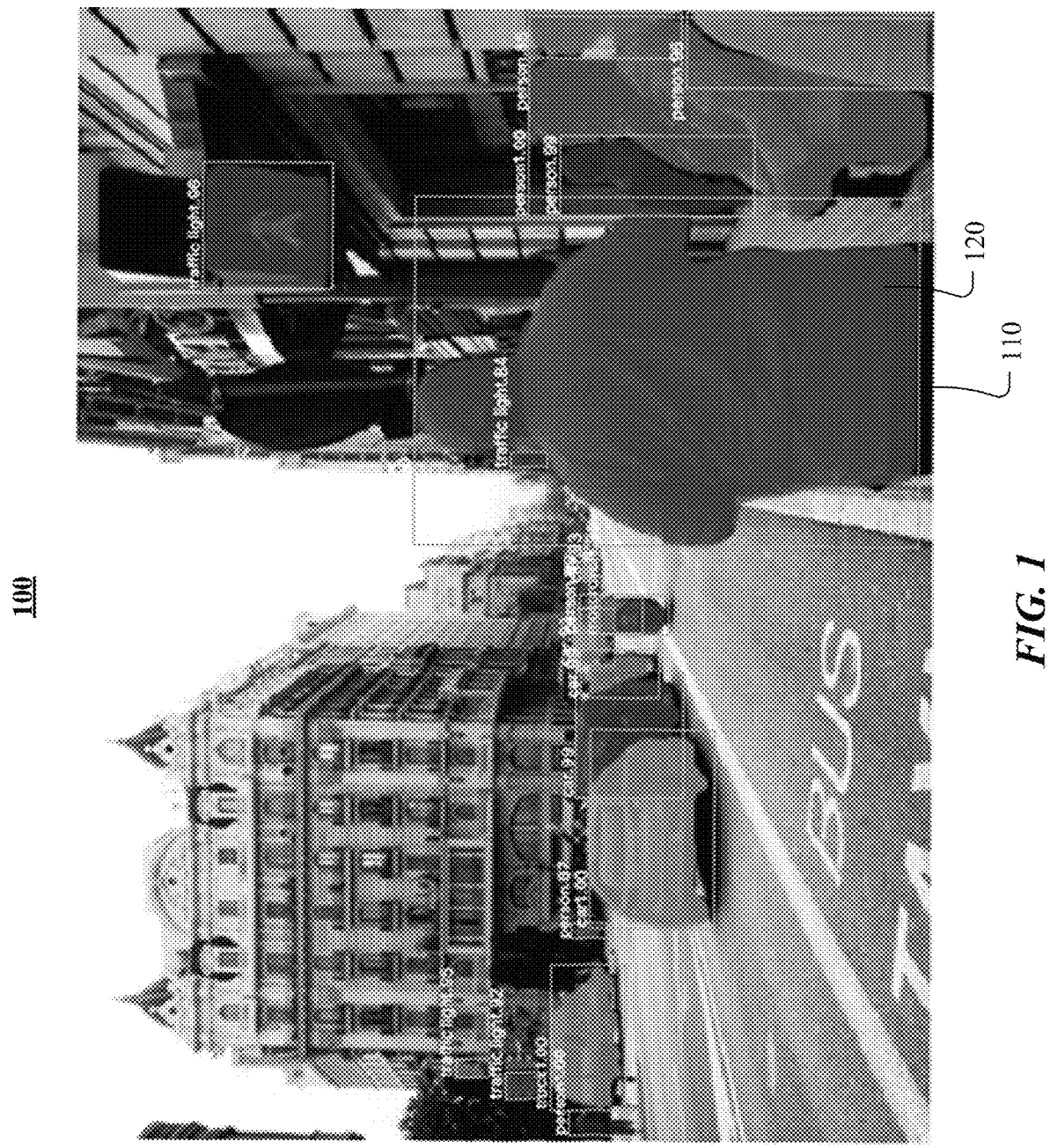
FIG. 1 illustrates an example of image with bounding boxes, segmentation masks, and keypoints.

FIG. 1 illustrates an example of an image 100 with bounding boxes 110 and segmentation masks 120, in accordance with certain embodiments. In particular embodiments, a machine-learning model is trained to process an image, such as image 100, and detect particular objects of interest in the image. In the example shown, the machine-learning model is trained to recognize features of people. In particular embodiments, the machine-learning model may output a bounding box 110 that surrounds a detected instance of an object type, such as a person. A rectangular bounding box may be represented as four two-dimensional coordinates that indicate the four corners of the box. In particular embodiments, the machine-learning model may additionally or alternatively output a segmentation mask 120 that identifies the particular pixels that belong to the detected instance. For example, the segmentation mask 120 may be represented as a two-dimensional matrix, with each matrix element corresponding to a pixel of the image and the element's value corresponding to whether the associated pixel belongs to the detected person. Although particular data representations for detected persons and segmentation information are described, this disclosure contemplates any suitable data representations of such information.

Figure 2A:
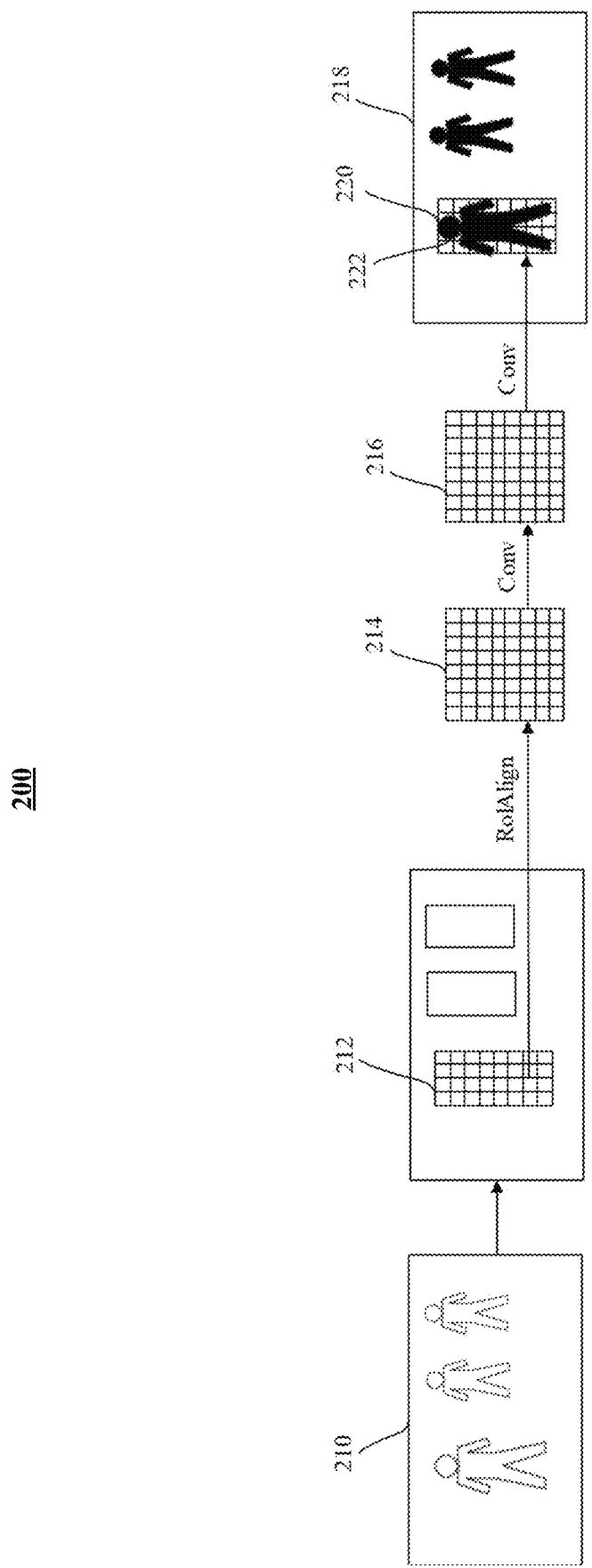
FIGS. 2A-2B illustrate example architectures of a machine-learning model for predicting bounding boxes, segmentation masks, and keypoints.

FIG. 2A illustrates an example architecture of a machine-learning model 200, in accordance with certain embodiments. The machine-learning model 200 is configured to take as input an image 210 or a preprocessed representation of the image, such as a three-dimensional matrix with dimensions corresponding to the image's height, width, and color channels (e.g., red, green, and blue). The machine-learning model 200 identifies a bounding box 212 that surrounds an object of interest (e.g., a person) in the image 210. Furthermore, the machine-learning model 200 is configured to read segments 222 in a bounding box 220 in a down-sampled version of the image 210, e.g., a down-sampled image 218, and detect the segments 222 which are regions of interests (RoIs) corresponding to the object of interest in the bounding box 212 in the image 210. In particular embodiments, the RoIs may include people, cars, or any other types of objects. The RoIs in the down-sampled image 218 may be detected via any operable computer-vision technology. For example, a Mask R-CNN, including RoIAlign or RoIWarp for RoI pooling, may process the image 210 to determine the bounding box 212 which are RoIs, convolute the image 210 into the down-sampled image 218 by mapping the bounding box 212 in the image 210 into a feature map (e.g., a bounding box 220 in the down-sampled image 218 corresponding to the bounding box 212 in the image 210) via convolutional layers 214, 216 using RoIAlign (e.g., based on coordinates of the bounding box 212), and output a segmentation mask corresponding to the feature in the bounding box 212 in the image 210. In particular embodiments, the machine-learning model 200 is configured to output an object detection (e.g., coordinates of a bounding box surrounding a person), keypoints (e.g., representing the pose of a detected person), and/or segmentation mask (e.g., identifying pixels that correspond to the detected person). In particular embodiments, each segmentation mask has the same number of pixels as the input image (e.g., the image 210). In particular embodiments, the pixels in the segmentation mask that correspond to the object of interest are marked as "1", and the rest are marked as "0", such that when the segmentation mask is overlaid over the input image, the machine-learning model 200 may effectively select the pixels that correspond to the object of interest in captured images (e.g., the segments comprising the features of the user in the image 210).

The machine-learning model's 200 architecture is designed to reduce complexities (thereby reducing processing needs), so that it may produce sufficiently accurate and fast results on devices with limited resources to meet the demands of real-time applications (e.g., 10, 15, or 30 frames per second). Compared to conventional architectures, such as those based on ResNet or Feature Pyramid Networks (FPN), the architecture of the machine-learning model 200 is much smaller in size and could generate predictions much faster (e.g., roughly 100× faster). Therefore, the machine-learning model disclosed in the present application may be used to detect a feature regarding an eye of the user, e.g., an outline of the eye of the user, for a real-time computation of a gaze of the user.

Figure 2B:
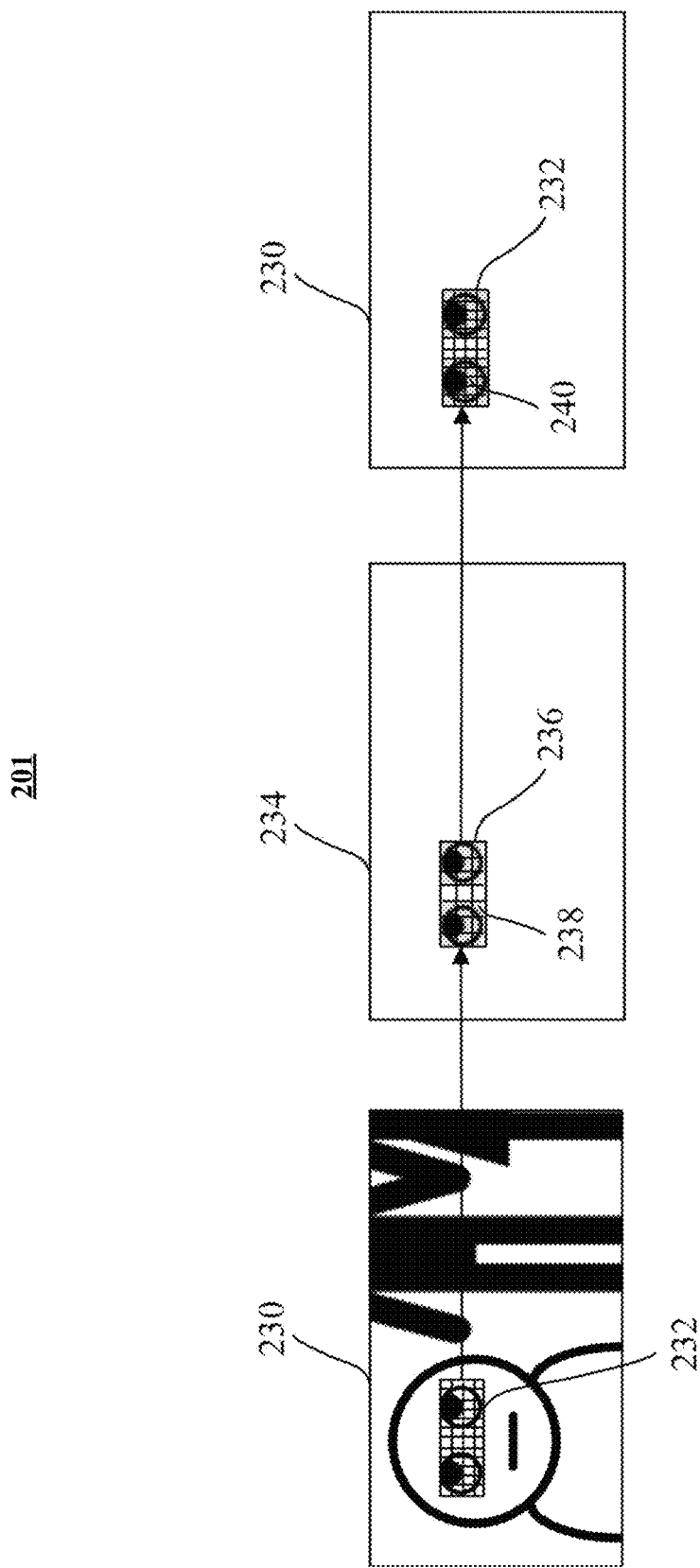

FIG. 2B illustrates an example architecture of a machine-learning model 201 for predicting bounding boxes, segmentation masks, and keypoints, in accordance with certain embodiments. The machine-learning model 201 is configured to take an input image 230 and, by processing a down-sampled version of the image 230 (e.g., a down-sampled image 234), to output N number of segments 236 which are RoIs in the down-sampled image 234. In particular embodiments, the RoIs are eye features/keypoints of a user, e.g., an outline of an eye of the user, an edge of iris, and/or reflections in an eye ball of the user.

In FIG. 2B, the input image 230 comprises a bounding box 232 which surrounds the eye features of the user and consists of one or more segments. The machine-learning model 201 processes a down-sampled version of the input image 230 (e.g., a down-sampled image 234) and reads segments in a bounding box 236 in the down-sampled image 234, which corresponds to the bounding box 232 in the input image 230, to detect one or more first segments 238 comprising the eye features of interest. Therefore, when there is a need to compute a gaze of the user, a tracking system implemented with the machine-learning model 201 can directly read/retrieve segments 240 in the input image 230 corresponding to the first segments 238 identified with eye features of the user in the down-sampled image 234.

In particular embodiments, the input image 230 may be stored in a memory or any storage devices, so that the down-sampled image 234 and portions of the full-resolution images (e.g., at least part of the down-sampled image 234) that depict eye features may be simply selectively read from the memory to minimize memory access which costs a lot of power.

In particular embodiments, the machine-learning model 200, 201 may include several high-level components, including a backbone neural network, a region proposal network (RPN) to detect a bounding box, a keypoint, and a segmentation mask. Each of these components may be configured as a neural network. Conceptually, in the architecture shown, the machine-learning model 200, 201 is configured to process an input image and prepare a feature map (e.g., an inception of convolutional outputs) that represents the image. The RPN takes the feature map generated by a neural network and outputs N number of proposed RoIs that may include objects of interest.

Figure 3:
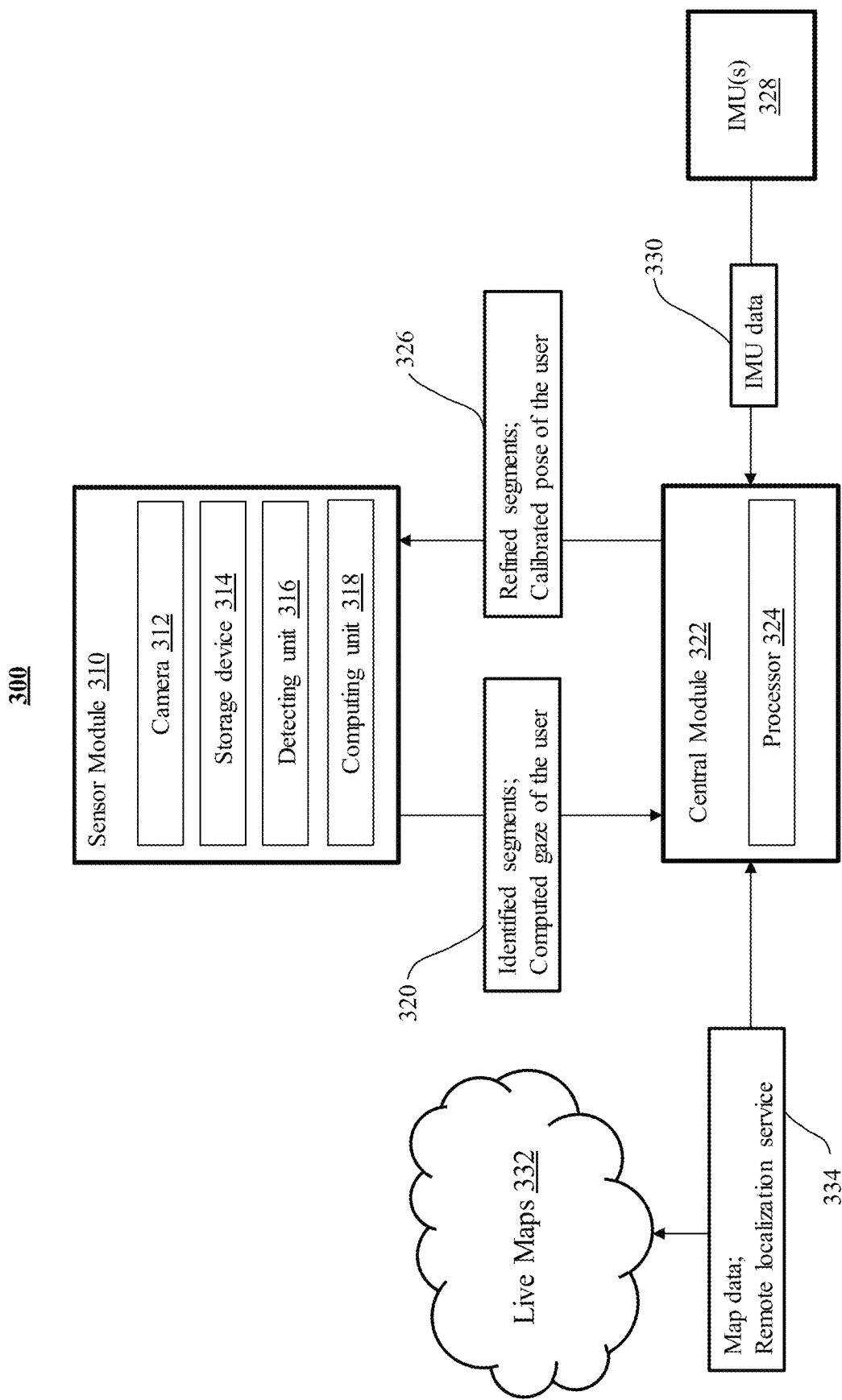
FIG. 3 illustrates an embodiment of a tracking system comprising a sensor module and a central module.

FIG. 3 illustrates an example tracking system architecture, in accordance with certain embodiments. The tracking system 300 comprises at least one sensor module 310 and a central module 322. The sensor module 310 comprises at least one camera 312 which captures one or more images of a user, which may be a series of frames of the user depicting eye features of the user, a storage device 314 which stores the captured images of the user, a detecting unit 316 which is implemented with a machine-learning model to detect segments comprising the eye features of the user in a down-sampled version of the captured images, and a computing unit 318 which computes a gaze of the user based on segments in the captured images corresponding to the detected segments in the down-sampled version of the captured images.

Furthermore, the central module 322 comprises at least one processor 324 which further processes the computed gaze of the user and identified segments in the captured images 320 from the sensor module 310 and inertial measurement unit (IMU) data 330 from one or more IMU(s) 328 which are implemented in a head-mounted device with the sensor module 310. For example, the central module 322 estimates a state of a user based on features in the identified segments of the captured images, and camera poses, velocity, acceleration and motion provided in the IMU data 330 sent from the IMU(s) 328, and furthermore, the central module 322 may utilize the state of the user to refine the segments in the captured images and provide the refined segments/gaze of the user 326 to the sensor module 310.

In particular embodiments, the central module 322 may perform extensive services for the computed gaze of the user 320 to reduce power consumption, such as locating the user/device locally or globally (e.g., a remote localization service 334). In particular embodiments, the central module 322 processes the IMU data 330 from the IMU(s) 328 to provide a predicted pose of the user in assistance of generating the state of a user. In particular embodiments, the central module 322 may locate the sensor module 310 by retrieving a live map 332 based on the features in the identified segments in the captured images 320 sent from the sensor module 310 if needed. The live maps 332 comprise map data 334 for localization of the user/the sensor module 310. The central module 322 may calibrate the pose of the user on the map data 334 and provide the calibrated pose of the user 326 to the sensor module 310. In particular embodiments, the central module 322 may comprise a storage device to store the captured images and/or the computed gaze of the user to reduce the weight of the sensor module 310. Detailed operations and actions performed at the sensor module 310 and the central module 322 may be further described in FIGS. 4A-4C.

In particular embodiments, the tracking system 300 may be implemented in any suitable computing device, such as, for example, a personal computer, a laptop computer, a cellular telephone, a smartphone, a tablet computer, an augmented/virtual reality device, a head-mounted device, a portable smart device, a wearable smart device, or any suitable device which is compatible with the tracking system 300. In the present disclosure, a user which is being tracked and localized by the tracking device may be referred to a device mounted on a movable object, such as a vehicle, or a device attached to a person. In the present disclosure, a user may be an individual (human user), an entity (e.g., an enterprise, business, or third-party application), or a group (e.g., of individuals or entities) that interacts or communicates with the tracking system 300. In particular embodiments, the sensor module 310 may be implemented in a head-mounted device, and the central module 322 may be implemented in a local computing device separated from the head-mounted device, as in a two-part system. The head-mounted device comprises one or more processors configured to implement the camera 312, the storage device 314, the detecting unit 316, and the computing unit 318 of the sensor module 310. In one embodiment, each of the processors is configured to implement the camera 312, the storage device 314, the detecting unit 316, and the computing unit 318 separately. The local computing device comprises one or more processors configured to execute the central module 322.

A lightweight, machine-learning (ML)-based eye tracking performs in stages (e.g., the head-mounted device) to minimize power consumption. The eye-tracking system is executed to perform down-sampling an image captured by the sensor module, identifying segments which are of interest (e.g., based on the outline of eye) from the down-sampled image, loading region of interest of high-resolution image based on the identified segments, and computing a gaze based on reflections/refractions in the RoI of the high-resolution image (e.g., the originally-captured images). The eye-tracking system only retrieves the RoI of the high-resolution image, and thereby a memory access and power consumption can be reduced.

This disclosure contemplates any suitable network to connect each element in the tracking system 300 or to connect the tracking system 300 with other systems. As an example and not by way of limitation, one or more portions of network may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network may include one or more networks.

Figure 4A:
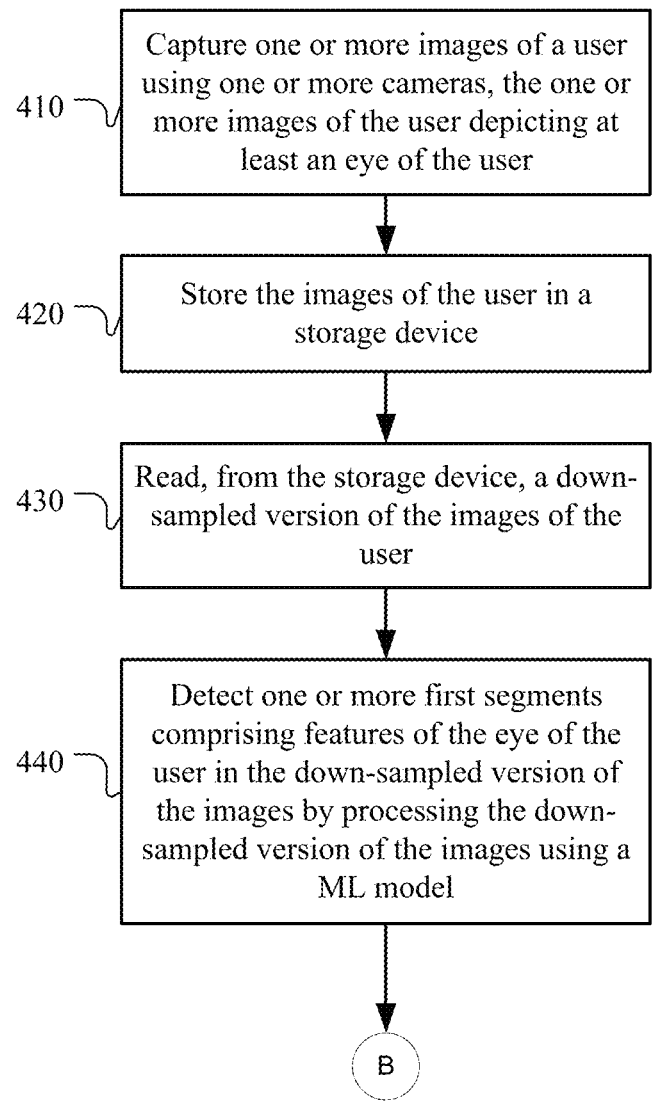
FIG. 4A illustrates an embodiment of a method for detecting segments comprising tracking features in a down-sampled version of images at a sensor module.

FIG. 4A illustrates an example method 400 for detecting segments comprising tracking features in a down-sampled version of images at a sensor module, in accordance with certain embodiments. The sensor module may be provided to or displayed on any computing system (e.g., an end user's device, such as a smartphone, virtual reality system, gaming system, etc.). The method 400 may begin at step 410 with capturing one or more images of a user using one or more cameras, the one or more images of the user depicting at least an eye of the user. In particular embodiments, the one or more images of the user comprise different gaze directions captured from one or more perspectives of the one or more cameras to determine the gaze of the user.

At step 420, the method 400 may store the one or more images of the user in a storage device. In particular embodiments, the storage device may be implemented in a head-mounted device with the one or more cameras.

At step 430, the method 400 may read, from the storage device, a down-sampled version of the one or more images of the user.

At step 440, the method 400 may detect one or more first segments comprising features of the eye of the user in the down-sampled version of the one or more images by processing the down-sampled version of the one or more images using a machine-learning model. In particular embodiments, the one or more first segments comprise at least part of an outline of the eye of the user.

Figure 4B:
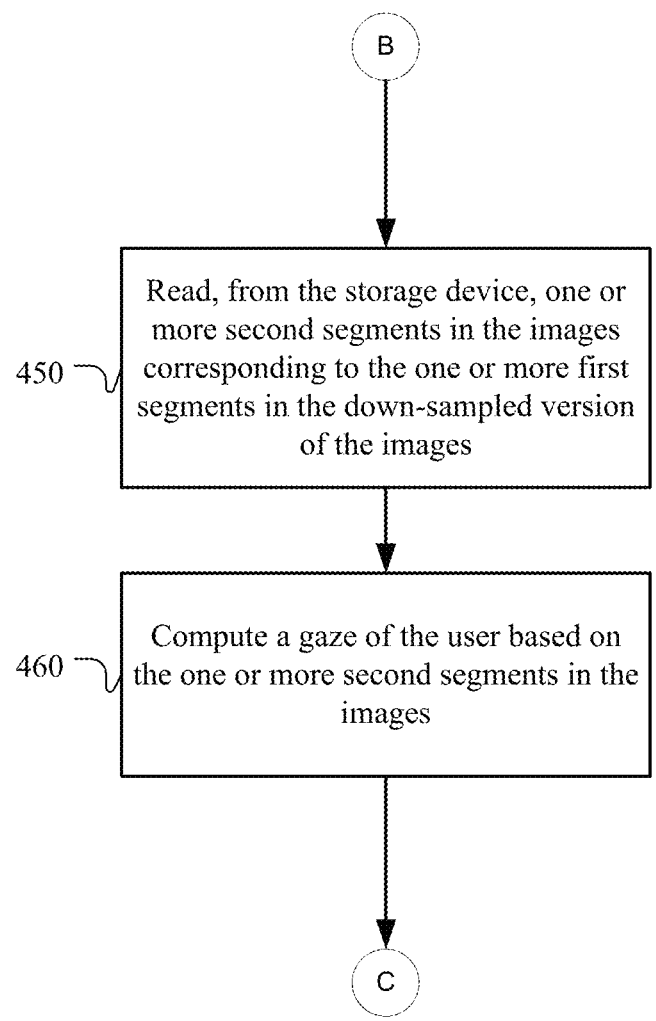
FIG. 4B illustrates an embodiment of a method for computing a gaze of a user by reading segments in the images corresponding to the detected segments in the down-sampled images at the sensor module.

FIG. 4B illustrates an example method 401 for computing a gaze of a user by reading segments in the images corresponding to the detected segments in the down-sampled images at the sensor module, in accordance with certain embodiments. The method 401 may begin, at step 450 follows the step 440 in the method 400, with reading, from the storage device, one or more second segments in the one or more images corresponding to the one or more first segments in the down-sampled version of the one or more images. In particular embodiments, the one or more second segments comprise reflections and/or refractions in the eye of the user. In particular embodiments, the one or more second segments comprise at least one gaze direction.

At step 460, the method 401 may compute a gaze of the user based on the one or more second segments in the one or more images.

Figure 4C:
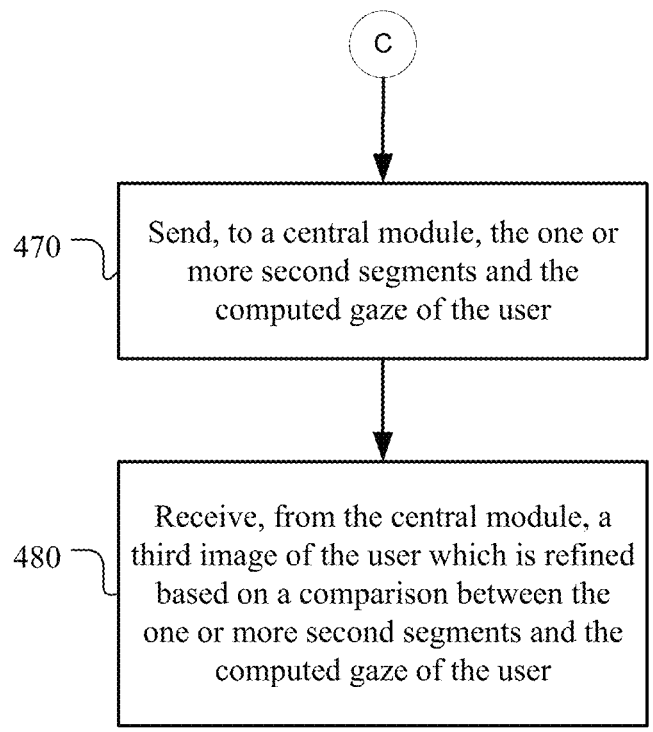
FIG. 4C illustrates an embodiment of a method for an image refinement processed at a central module.

FIG. 4C illustrates an example method 402 for an image refinement processed at a central module, in accordance with certain embodiments. The method 402 may begin, at step 470 follows the step 460 in the method 401, with sending, to a central module, the one or more second segments and the computed gaze of the user.

At step 480, the method 402 may receive, from the central module, a third image of the user which is refined based on a comparison between the one or more second segments and the computed gaze of the user. In particular embodiments, the central module may be implemented in a local computing device separated from the head-mounted device. The central module may process any potential requests/services for the sensor module to reduce power consumption.

Particular embodiments may repeat one or more steps of the method of FIGS. 4A-4C, where appropriate. Although this disclosure describes and illustrates particular steps of the method of FIGS. 4A-4C as occurring in a particular order, this disclosure contemplates any suitable steps of the method of FIGS. 4A-4C occurring in any suitable order. Moreover, although this disclosure describes and illustrates an example method for local localization including the particular steps of the method of FIGS. 4A-4C, this disclosure contemplates any suitable method for local localization including any suitable steps, which may include all, some, or none of the steps of the method of FIGS. 4A-4C, where appropriate. Furthermore, although this disclosure describes and illustrates particular components, devices, or systems carrying out particular steps of the method of FIGS. 4A-4C, this disclosure contemplates any suitable combination of any suitable components, devices, or systems carrying out any suitable steps of the method of FIGS. 4A-4C.

Figure 5:
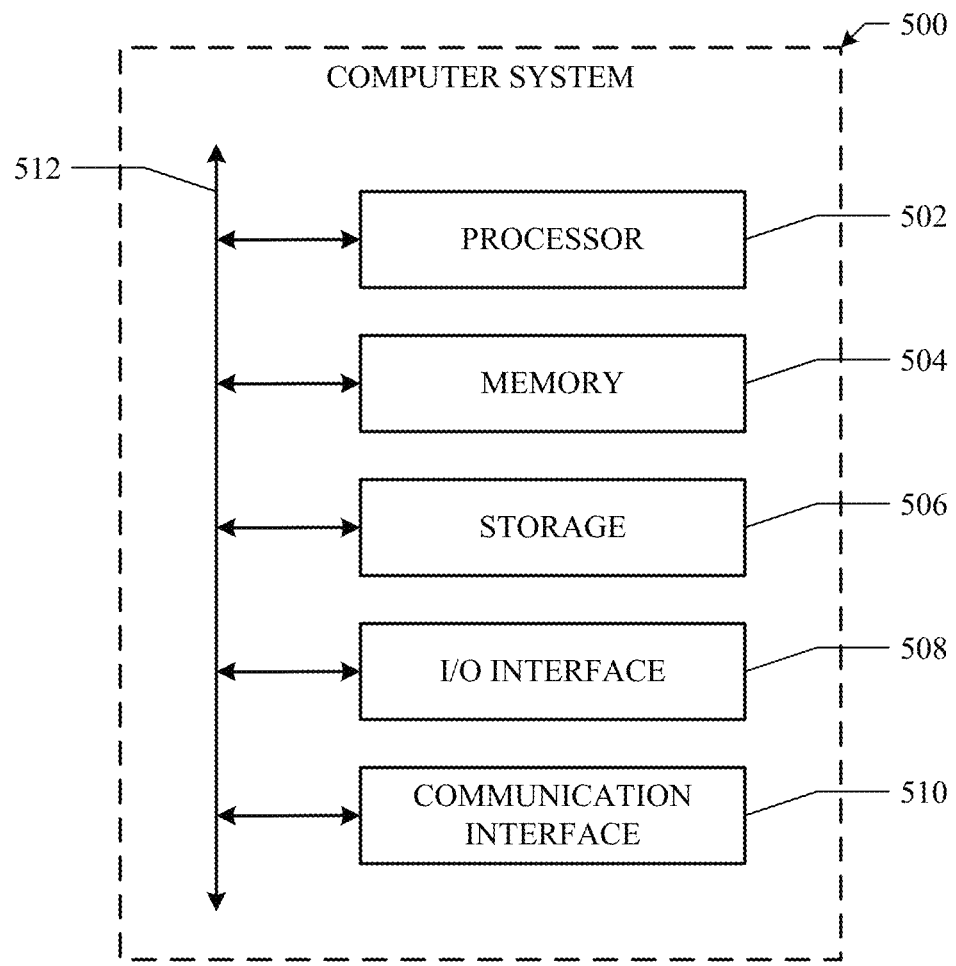
FIG. 5 illustrates an example computer system.

FIG. 5 illustrates an example computer system 500, in accordance with certain embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate.

In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

According to various embodiments, an advantage of features herein is that a sensor module may be able to detect a tracking feature in one or more segments from a down-sampled version of captured images via a trained machine-learning model, such that the sensor module can reduce memory access and power consumption by reading the segments from the down-sampled images to detect the tracking feature, e.g., the reduction of the amount of the segments. Particular embodiments of the present disclosure also enable the sensor module to transmit a computed image, which is generated based on the identified segments in the captured images corresponding to the detected segments in the down-sampled images, to a central module for a further process, such as image refinement and calibration, to save power. Therefore, particular embodiments disclosed in the present disclosure may provide a light weight, power-efficient wearable tracking device.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising, by a computing system:
capturing one or more images of a user using one or more cameras, the one or more images of the user depicting at least an eye of the user;
storing the one or more images of the user in a storage device;
reading, from the storage device, a down-sampled version of the one or more images of the user;
detecting one or more first segments in the down-sampled version of the one or more images by processing the down-sampled version of the one or more images using a machine-learning model, the one or more first segments comprising features of the eye of the user;
reading, from the storage device, one or more second segments in the one or more images corresponding to the one or more first segments in the down-sampled version of the one or more images; and
computing a gaze of the user based on the one or more second segments in the one or more images.

2. The method of claim 1, wherein the one or more first segments comprise at least part of an outline of the eye of the user.

3. The method of claim 1, wherein the one or more second segments comprise reflections in the eye of the user.

4. The method of claim 1, further comprising:
sending, to a central module, the one or more second segments and the computed gaze of the user; and
receiving, from the central module, a third image of the user which is refined based on a comparison between the one or more second segments and the computed gaze of the user.

5. The method of claim 1, wherein the one or more images of the user comprise different gaze directions captured from one or more perspectives of the one or more cameras to determine the gaze of the user.

6. The method of claim 1, wherein the one or more second segments comprise at least one gaze direction.

7. The method of claim 1, wherein the one or more second segments are compared with the computed gaze of the user to update the machine-learning model.

8. The method of claim 4,
wherein the one or more cameras are located within a head-mounted device; and
wherein the central module is implemented in a local computing device separated from the head-mounted device.

9. The method of claim 8, wherein the storage device is implemented in the head-mounted device.

10. One or more computer-readable non-transitory storage media embodying software that is operable when executed to:
capture one or more images of a user using one or more cameras, the one or more images of the user depicting at least an eye of the user;
store the one or more images of the user in a storage device;
read, from the storage device, a down-sampled version of the one or more images of the user;
detect one or more first segments in the down-sampled version of the one or more images by processing the down-sampled version of the one or more images using a machine-learning model, the one or more first segments comprising features of the eye of the user;
read, from the storage device, one or more second segments in the one or more images corresponding to the one or more first segments in the down-sampled version of the one or more images; and
compute a gaze of the user based on the one or more second segments in the one or more images.

11. The media of claim 10, wherein the one or more first segments comprise at least part of an outline of the eye of the user.

12. The media of claim 10, wherein the one or more second segments comprise reflections in the eye of the user.

13. The media of claim 10, wherein the software is further operable when executed to:
send, to a central module, the one or more second segments and the computed gaze of the user; and
receive, from the central module, a third image of the user which is refined based on a comparison between the one or more second segments and the computed gaze of the user.

14. The media of claim 10, wherein the one or more images of the user comprise different gaze directions captured from one or more perspectives of the one or more cameras to determine the gaze of the user.

15. The media of claim 10, wherein the one or more second segments are compared with the computed gaze of the user to update the machine-learning model.

16. The media of claim 13,
wherein the one or more cameras are located within a head-mounted device; and
wherein the central module is implemented in a local computing device separated from the head-mounted device.

17. The media of claim 16, wherein the storage device is implemented in the head-mounted device.

18. A system comprising: one or more processors; and one or more computer-readable non-transitory storage media coupled to one or more of the processors and comprising instructions operable when executed by the one or more of the processors to cause the system to:
- capture one or more images of a user using one or more cameras, the one or more images of the user depicting at least an eye of the user;
- store the one or more images of the user in a storage device;
- read, from the storage device, a down-sampled version of the one or more images of the user;
- detect one or more first segments in the down-sampled version of the one or more images by processing the down-sampled version of the one or more images using a machine-learning model, the one or more first segments comprising features of the eye of the user;
- read, from the storage device, one or more second segments in the one or more images corresponding to the one or more first segments in the down-sampled version of the one or more images; and
- compute a gaze of the user based on the one or more second segments in the one or more images.

19. The system of claim 18, wherein the one or more first segments comprise at least part of an outline of the eye of the user.

20. The system of claim 18, wherein the instructions are further operable when executed to:
- send, to a central module, the one or more second segments and the computed gaze of the user; and
- receive, from the central module, a third image of the user which is refined based on a comparison between the one or more second segments and the computed gaze of the user.

* * * * *